United States Patent
Filippi et al.

(10) Patent No.: US 8,545,727 B2
(45) Date of Patent: Oct. 1, 2013

(54) PROCESS FOR PRODUCING AMMONIA SYNTHESIS GAS

(75) Inventors: Ermanno Filippi, Castagnola (CH); Marco Badano, Lugano-Besso (CH); Geoffrey Frederick Skinner, Reading (GB)

(73) Assignee: Ammonia Casale SA (CH)

( * ) Notice: Subject to any disclaimer, the term of this patent is extended or adjusted under 35 U.S.C. 154(b) by 35 days.

(21) Appl. No.: 13/120,396

(22) PCT Filed: Aug. 26, 2009

(86) PCT No.: PCT/EP2009/060970
§ 371 (c)(1),
(2), (4) Date: Mar. 22, 2011

(87) PCT Pub. No.: WO2010/037598
PCT Pub. Date: Apr. 8, 2010

(65) Prior Publication Data
US 2011/0168948 A1 Jul. 14, 2011

(30) Foreign Application Priority Data
Oct. 2, 2008 (EP) .................................. 08017372

(51) Int. Cl.
C01B 3/04 (2006.01)
C01C 1/04 (2006.01)
(52) U.S. Cl.
USPC .......................................... 252/374; 423/359
(58) Field of Classification Search
USPC .......................................................... 252/374
See application file for complete search history.

(56) References Cited

U.S. PATENT DOCUMENTS

| 4,296,085 A | 10/1981 | Banquy |
| 4,469,665 A | 9/1984 | Pinto |
| 4,910,007 A | 3/1990 | Pinto et al. |
| 5,736,116 A | 4/1998 | LeBlanc et al. |
| 2004/0182002 A1 | 9/2004 | Malhotra et al. |
| 2006/0171878 A1 | 8/2006 | Blumenfeld et al. |
| 2009/0035206 A1 | 2/2009 | Filippi |

FOREIGN PATENT DOCUMENTS
WO 2005/118126 A1 12/2005

*Primary Examiner* — Melvin C Mayes
*Assistant Examiner* — Kenneth Vaden
(74) *Attorney, Agent, or Firm* — Akerman Senterfitt

(57) ABSTRACT

A process for producing ammonia synthesis gas, where a natural gas feedstock (10) is reformed in a primary steam reformer (12) and in a secondary reformer (14) at a pressure of at least 35 bar; the product syngas (16) at the output of the secondary reformer is cooled and subject to catalytic medium-temperature shift, converting the CO into $CO_2$ and $H_2$; downstream said medium-temperature shift, the carbon dioxide is removed from the syngas by physical absorption.

4 Claims, 1 Drawing Sheet

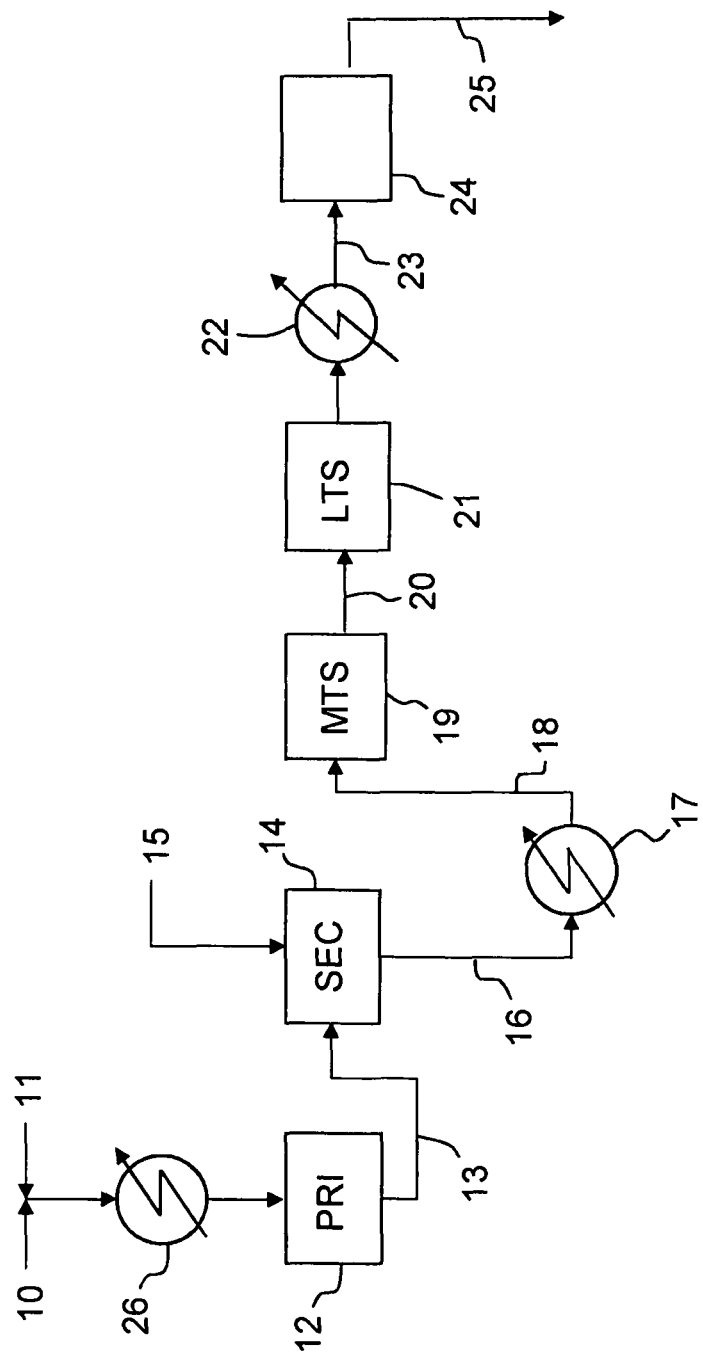

US 8,545,727 B2

PROCESS FOR PRODUCING AMMONIA SYNTHESIS GAS

FIELD OF THE INVENTION

The invention relates to reforming of hydrocarbons for the preparation of a synthetic gas (syngas) required for the manufacture of ammonia.

PRIOR ART

The preparation of ammonia requires a synthesis gas comprising hydrogen ($H_2$) and nitrogen ($N_2$) in a suitable ratio of 3:1.

It is known in the art to produce said syngas from the reforming of a hydrocarbon (HC) feedstock. Said HC feedstock is generally a raw source of hydrogen and carbon, such as for example methane, natural gas, naphtha, GPL (liquefied petroleum gas) or refinery gas and mixtures thereof. Usually, the feedstock is natural gas or methane.

In a well known process, desulphurized hydrocarbons are mixed with steam in a suitable ratio and the resulting mixture is admitted at a primary reformer in which most of the hydrocarbons in the feed are steam reformed (converted) into a mixture of carbon monoxide, carbon dioxide and hydrogen by passage over a suitable catalyst at moderate pressures, in the range of 15 to 35 bar, and high temperatures in the range of 780° C. to 820° C.

As said conversion is endothermic, the catalyst is contained in a multiplicity of catalytic tubes which are heated externally by the heat of reaction supplied by the combustion of a gaseous fuel with air. The pressure outside the tubes is normally close to atmospheric.

The gas product exiting the primary reformer is fed to a secondary reformer usually containing a suitable catalyst in a catalytic bed and a reaction space overlying the catalytic bed, the secondary reformer also receiving a flow of air in a controlled amount to supply the nitrogen required for the downstream ammonia synthesis.

The oxygen reacts in the reaction space above the catalyst bed with the combustible components of the product gas coming from the primary reformer and the resulting combined product gas enters the catalyst bed at elevated temperature.

During passage down through the catalyst, the residual methane reacts endothermically with steam, resulting in a typical exit temperature of the secondary reformer outlet gas of around 1000° C. with over 99% of the hydrocarbons feed converted to carbon oxides and hydrogen.

The reformed gas exiting the secondary reformer is then typically treated in a series of down-stream equipments to remove carbon oxides and obtain a gas composition suitable for ammonia synthesis (i.e. having a $H_2/N_2$ molar ratio close to 3:1). These equipments include at least:

A 'high temperature' CO shift converter followed by a 'low temperature' shift converter where most of the carbon monoxide (CO) of the reformed gas is catalytically converted with unreacted steam to carbon dioxide plus an additional volume of hydrogen, a $CO_2$ washing column where the carbon dioxide is removed by scrubbing the gas with an appropriate solvent such as an aqueous solution of an amine or of potassium carbonate, so obtaining a gas flow comprising hydrogen and nitrogen in approximately 3:1 molar ratio and traces of methane, carbon oxides and argon, a methanation reactor where the residual carbon oxides are catalytically converted to methane to avoid poisoning of the downstream ammonia synthesis catalyst by oxygen-containing compounds.

The ammonia syngas is then obtained at low pressure, typically 15-25 bar, and is compressed to reach the pressure of the ammonia synthesis loop, generally in the range of 80 to 300 bar and typically around 150 bar.

The low pressure of the output syngas is a drawback of the process, as a large compression section is required. Also other equipments such as the pipework are larger, and hence more expensive, due to this relatively low pressure.

Another drawback is that the steam-to-carbon ratio in the primary reformer must be maintained over a certain lower limit, usually around 2.7. This is because at a low SC ratio the catalyst of conventional 'high temperature' CO shift converters would suffer over-reduction and undesired byproducts from the Fischer-Tropsch synthesis. A high SC ratio, however, means that more flow rate passes through the primary reformer and, hence, the primary reformer is greater and more expensive for a given production rate or, conversely, the boosting of the production rate is limited by the size of the reformer.

A further drawback is that the shift of CO to $CO_2$ and the subsequent removal of $CO_2$ are generally expensive process steps. In particular, the aforesaid chemical process of $CO_2$ removal, based on reaction with amine or potassium carbonate, needs a large amount of heat and, hence, is another reason to keep a high SC ratio. A gas flow with a lower SC ratio would not be able to furnish the heat necessary for the chemical $CO_2$ removal.

SUMMARY OF THE INVENTION

The problem underlying the present invention is to overcome the above drawbacks.

This problem is solved by a process for producing ammonia synthesis gas from a hydrocarbon-containing feedstock, comprising the steps of steam-reforming of said hydrocarbon-containing feedstock in a primary reformer, obtaining a partially reformed gas stream, and secondary reforming of said partially reformed gas stream in a secondary reformer, operating with air in excess, the process being characterized in that:

the primary reforming and the secondary reforming are operated at a pressure of at least 35 bar;
the syngas at the output of the secondary reforming is cooled and subject to catalytic medium-temperature shift, converting the CO into $CO_2$ and $H_2$, and
downstream said medium-temperature shift, the syngas is subjected to $CO_2$ removal by physical absorption.

According to a preferred embodiment, the medium-temperature shift is carried out at isothermal conditions, preferably at a substantially constant temperature in the range 220-320° C. In a more preferred embodiment the medium-temperature shift is carried out on a copper-based catalyst at a substantially constant temperature in the range 220-320° C.

In a further aspect of the invention, the partially reformed syngas at the outlet of the primary reformer has a relatively low temperature, less than 750° C. and preferably in the range 650-750° C.

The invention allows to keep a steam-to-carbon (SC) ratio in the primary reformer significantly lower than in the prior art. In a preferred embodiment, the SC ratio in the primary reformer is less than 2.7.

According to another aspect of the invention, a further low-temperature shift (LTS) is carried out downstream the medium-temperature shift (MTS). Hence, the syngas at the outlet of the MTS reactor is further cooled and sent to a LTS reactor, which is per se conventional, to maximize the conversion of CO into $CO_2$ and $H_2$. The syngas at the outlet of the LTS reactor is then cooled and sent to the $CO_2$ removal.

The $CO_2$ removal is carried out preferably with methanol or an organic compound (e.g. dimethyl ethers of polyethylene glycol) as solvent. $CO_2$ removal is performed for example with the process known under the trade name Rectisol, or the process known under the trade name Selexol. Both these processes uses a physical solvent to remove the carbon dioxide from the syngas stream. Another equivalent process, however, can be used.

The primary reformer is usually equipped with a plurality of heated catalytic tubes, and the operating pressure in said catalytic tubes is preferably 40 to 100 bar, most preferably 60 to 80 bar. For instance, catalytic tubes of conventional internal diameter of around 100 mm and wall thickness of 10-12 mm can operate, according to the invention, at 60 bar pressure and 750° C. outlet temperature, showing a lifetime of around 100.000 hours.

The excess of air in the secondary reforming is comprised in the range of 15% to 100%, preferably 20% to 40%, over the amount of air necessary to produce the nitrogen content required for ammonia synthesis. The use of excess air allows to effectively convert the hydrocarbons (in particular methane) contained in the primary reformer outlet gas (the hydrocarbon content being increased as a result of both the increased pressure and reduced temperature in the primary reformer) in the space above the catalytic bed of the secondary reforming to produce carbon oxides and steam, so obtaining a product gas at elevated temperature.

An object of the invention is also an apparatus for the production of ammonia syngas, adapted to operate according to the above process and comprising a primary reformer, a secondary reformer and at least a medium-temperature shift reactor receiving the syngas from the secondary reformer, and a suitable $CO_2$-removal unit downstream said medium-temperature shift reactor and operating by physical absorption.

A further object of the invention is the revamping of the front-end of an ammonia plant. As an example, the revamping of a conventional front-end is characterized by the provision of at least a medium-temperature shift reactor and a $CO_2$-removal unit downstream said medium-temperature shift reactor, said $CO_2$-removal unit being adapted to operate by physical absorption.

The invention has the advantage that the MTS reactor can operate at a lower SC ratio than the conventional high-temperature shift reactors, as the copper-based catalyst does not suffer the drawbacks of over-reduction and Fischer-Tropsch synthesis. The lower SC ratio means a smaller flow rate in the primary reformer for a given syngas production; as a consequence the reformer itself is smaller, less expensive and requires less energy than in the prior art. The isothermal reactor is a further advantage, keeping the MTS catalytic bed at a relatively low temperature (220-320° C.) where maximum efficiency is obtained.

The $CO_2$ removal with a physical rather than chemical solvent is synergistic with the high pressure and low SC ratio in the reformers. In fact, said $CO_2$ removal process requires less heat than the chemical process, thus being suitable for a low SC ratio, and the efficiency is proportional to the partial pressure of the $CO_2$ in the syngas, thus being suitable for the inventive high-pressure reforming.

Another advantage of operating at a high pressure is that it is possible to employ smaller and less expensive equipments for compressing the final synthesis gas to the pressure required for conversion into ammonia in a synthesis loop of a ammonia plant. In addition, the energy required for this compression is reduced as the final synthesis gas is already obtained with a high pressure at the outlet of the reforming process. Therefore, a reduction of the energy consumption in ammonia plant employing high pressure synthesis gas obtained according to the invention can also be achieved.

The characteristics and advantages of the invention will further result from the following description of an embodiment thereof given by way of non limiting example with reference to the attached drawing.

BRIEF DESCRIPTION OF THE FIGURES

FIG. 1 is a block diagram of the front-end of an ammonia synthesis plant, according to the invention.

DETAILED DESCRIPTION OF A PREFERRED EMBODIMENT

Referring to FIG. 1, a mixture of a desulphurized natural gas feedstock 10 and steam 11 is pre-heated in a pre-heater 26 and reacted in a primary steam reformer 12, producing a partially reformed gas stream 13, preferably at a pressure of 60 to 80 bar and a temperature of around 750° C.

Said partially reformed gas 13 is further treated in a secondary reformer 14, operating with excess of air due to an inlet 15 of air, oxygen or oxygen-enriched air.

The primary reformer 12, for example, comprises a plurality of tubes (not shown) filled with a suitable catalyst, per se conventional, which are externally heated through a thermal exchange fluid. The secondary reformer 14 includes, for example, a catalytic bed of a suitable catalyst (for example a nickel-based catalyst) and an overlying reaction space, where the oxygen fed to the secondary reformer 14, via the air stream 15, reacts with the partially reformed gas 13.

The gas stream 16 from the secondary reformer 14, usually at a temperature around 1000° C., is then cooled in a heat exchanger 17, down to 220-320° C. (stream 18), and sent to a medium-temperature shift (MTS) reactor 19.

The MTS reactor 19 is an isothermal catalytic reactor, comprising a copper-based catalytic bed and an internal heat exchanger immersed in the catalytic bed and adapted to maintain the reaction temperature in a predetermined range.

Downstream the MTS reactor 19, the syngas 20 can be further treated in an optional low-temperature shift (LTS) reactor 21, to maximize the conversion of the CO.

The syngas at the output of the MTS reactor 19 or—if provided—of the LTS reactor 21, is further cooled in a heat exchanger 22 and the cooled syngas stream 23 is sent to a $CO_2$-removal unit 24. This unit 24 removes the carbon dioxide with a physical solvent, for example with the known Rectisol or Selexol process, or another equivalent process.

The syngas 25 from said $CO_2$-removal unit is further treated in a methanator where residual carbon oxides are catalytically converted to methane, and in a cryogenic section for cryogenic removal of nitrogen in excess, methane and inerts. The output of the cryogenic section is ammonia syngas containing hydrogen and nitrogen in the required 3:1 molar ratio.

It should be noted that, due to the high operating pressure of the reformer 12 and all the downstream equipments, the stream 25 is available at high pressure and hence, after the steps of methanation and cryogenic purification, there is a substantial energy saving in the syngas compression. In some applications, the syngas from the cryogenic section can be directly fed to the ammonia synthesis loop.

In the example of FIG. 1, all the natural gas feed 10 is supplied to the primary reformer 12; in another embodiment of the invention (not shown), a portion of the natural gas feedstock 10 is fed to the secondary reformer 14.

It should be noted that FIG. 1 is simplified, not showing auxiliary equipments such as valves, etc. . . . that may be provided according to the needs. Of course, a man skilled in the art can bring numerous modifications and alternatives to the process according to the invention, all of which are covered by the scope of protection of the following claims.

The invention claimed is:

1. A process for producing ammonia synthesis gas from a hydrocarbon-containing feedstock, the process comprising the steps of steam-reforming of said hydrocarbon-containing feedstock in a primary reformer, wherein all feedstock is supplied to said primary reformer, obtaining a partially reformed gas stream, and secondary reforming of said partially reformed gas stream in a secondary reformer, operating with air in excess, wherein:

the primary reforming and the secondary reforming are operated at a pressure of at least 35 bar;

the product syngas at the output of the secondary reforming is cooled and subject to catalytic medium-temperature shift, converting CO into $CO_2$ and $H_2$, said medium-temperature shift being carried out on a copper-based catalyst at a substantially constant temperature in the range 220-320° C.;

downstream said medium-temperature shift, $CO_2$ is removed from the syngas by physical absorption;

wherein the steam-to-carbon ratio in the primary reformer is less than 2.7.

2. The process according to claim 1, wherein the partially reformed syngas at the outlet of the primary reformer has a temperature in the range 650-750° C.

3. The process according to claim 1, wherein a further low-temperature shift is carried out on the syngas stream downstream the medium-temperature shift.

4. The process according to claim 1, wherein $CO_2$ is removed using methanol as a solvent, or an organic solvent.

* * * * *